May 12, 1936. W. L. MORRISON 2,040,624
VEHICLE WIND DEFLECTOR
Filed April 19, 1934  2 Sheets-Sheet 1
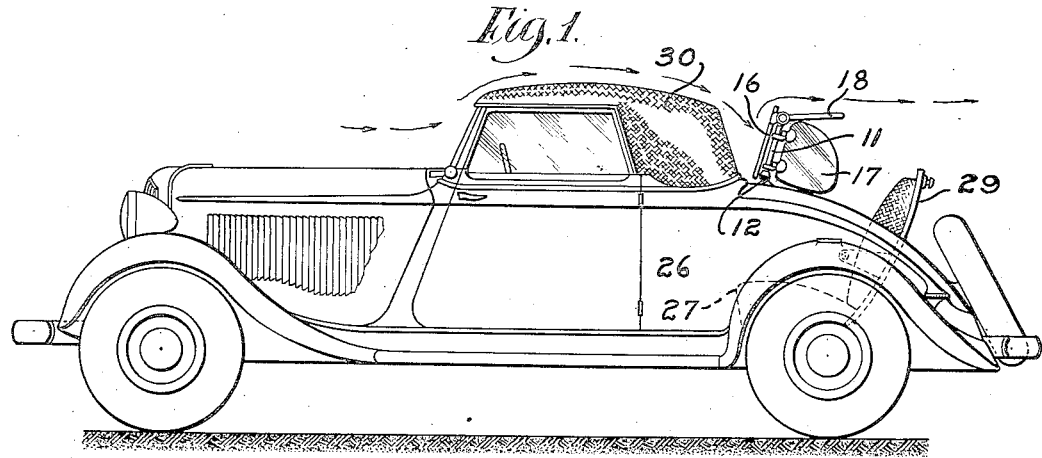
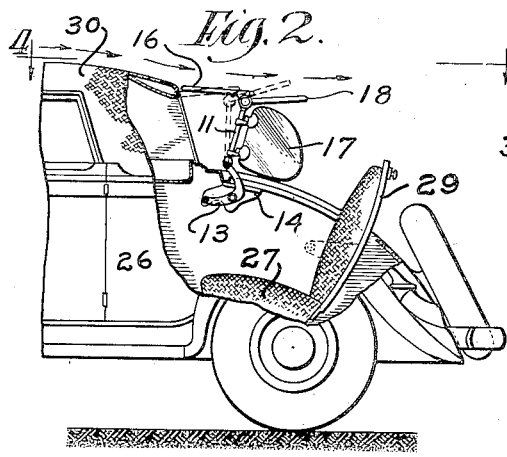 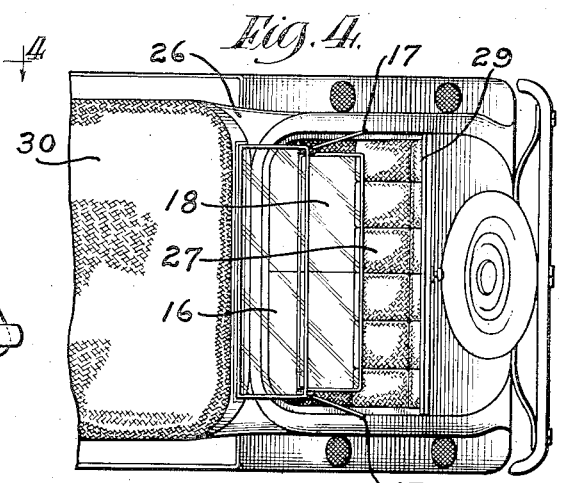
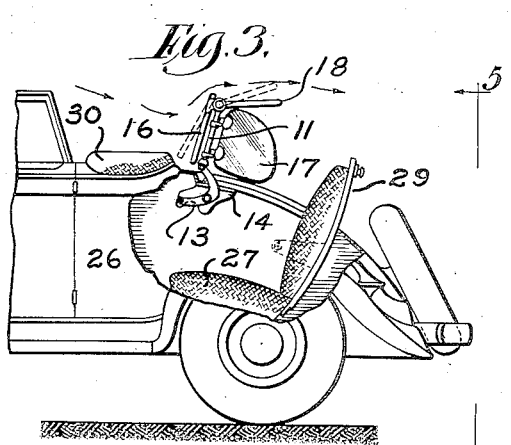 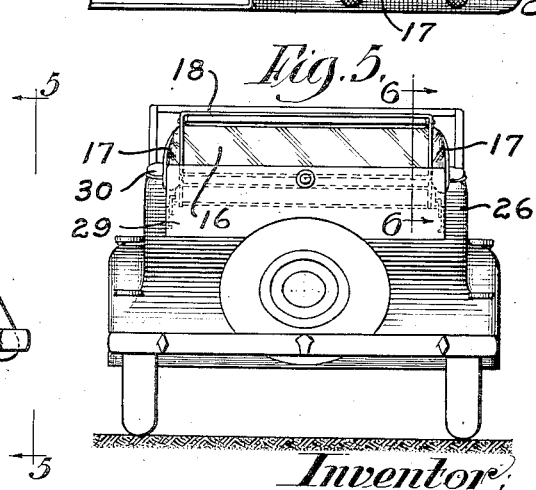
Inventor,
Willard L. Morrison,
By Morsell, Lieber & Morsell
Attys.

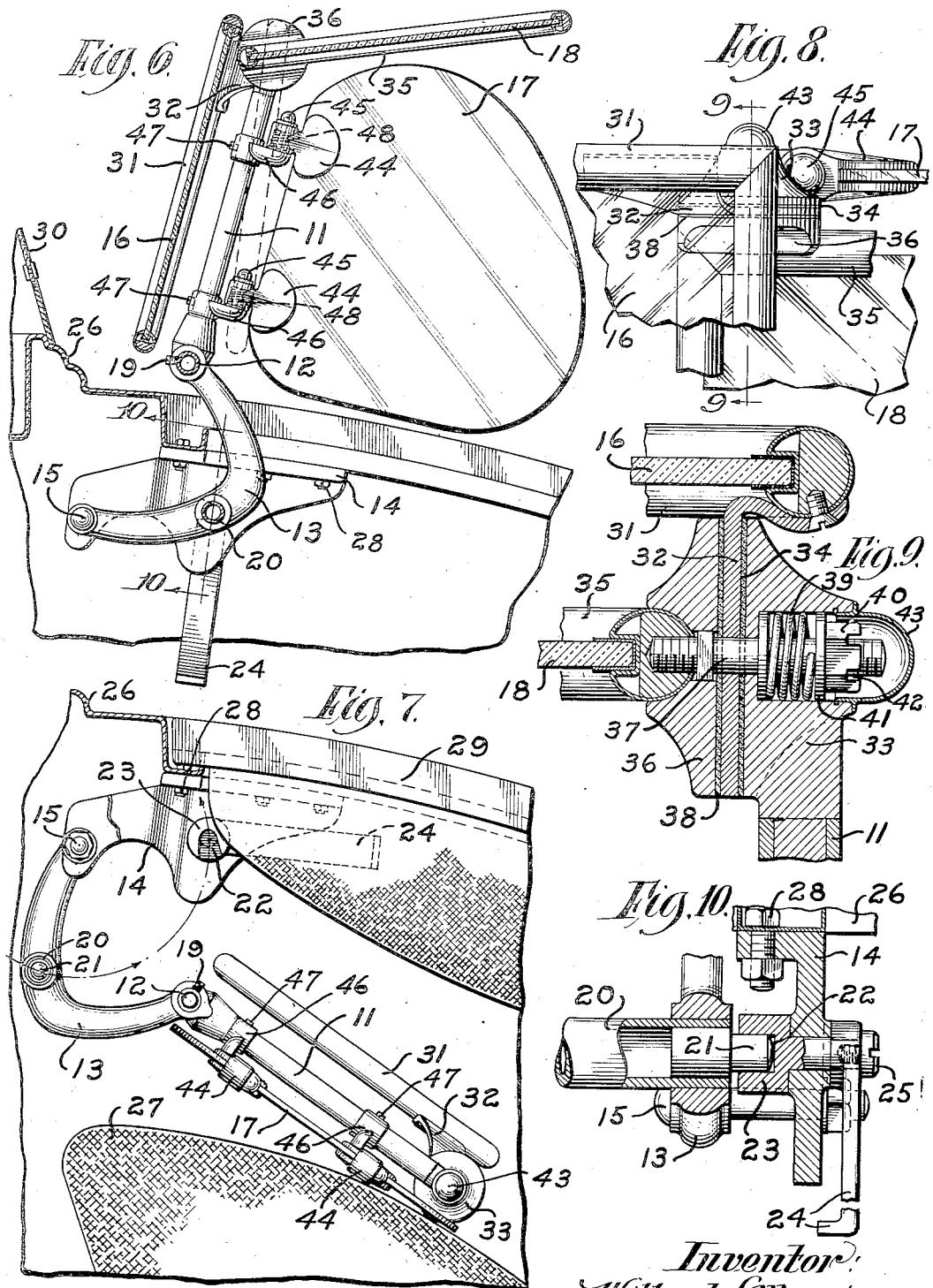

Patented May 12, 1936

2,040,624

UNITED STATES PATENT OFFICE 2,040,624

VEHICLE WIND DEFLECTOR

Willard L. Morrison, Lake Forest, Ill.

Application April 19, 1934, Serial No. 721,337

16 Claims. (Cl. 296—85)

This invention relates generally to improved structure for protecting the occupants of vehicles' seats against undesirable drafts and wind.

Many types of automobiles are provided with one or more open seats, such as the usual rumble seat located at the rear of a coupe, and inasmuch as these seats are normally uncovered when in use, the occupants are frequently exposed to undesirable wind and weather. When the vehicle is traveling forward at high speed, the upwardly projecting forward portion of the body creates a suction at the rear of the machine; and this suction creates drafts over the top and inwardly at the rear side portions of the front seat enclosure, thus tending to make occupancy of the open rear seat relatively uncomfortable.

While it has heretofore been proposed, as shown and described in my copending application Serial No. 634,117, filed September 21, 1932, to eliminate such objectionable side and down drafts in the vicinity of a rumble seat by providing independently adjustable, opposite side wings and a horizontally pivoted top shield adapted to be disposed in front of the open rear seat and in close proximity to the front seat enclosure, this prior protective device does not eliminate all undesirable draft under all conditions of use of the vehicle. For instance, if the front seat enclosure is removed, the prior protective device will no longer afford protection for the occupants of the rear open seats; and this prior structure, moreover, does not provide sufficient protection against rain and sleet.

It is therefore an object of the present invention to provide an improved vehicle wind deflector associable with the rear normally open seat, which functions independently of the front seat enclosure to protect the rear seat occupants against undesirable draft and precipitation.

Some of the more specific objects of the invention are as follows:

To provide a protective device for rumble seats or the like, which may be readily installed or applied, and which is highly flexible and effective in use.

To provide an accessory for protecting the occupants of vehicle-seats, which may be conveniently applied or removed without marring the finish of the car, and which is, moreover, of neat and attractive appearance.

To provide an easily adjustable protective shield assembly which may be applied to various types of automobiles and the deflectors of which may be adjusted to meet various weather conditions and requirements.

To provide a rumble seat protector which functions independently of other structural elements of the vehicle, to protect the occupants of the rumble seat against drafts and precipitation, and which may be placed out of sight when the rumble seat is not in use.

To provide simple and efficient means for producing stream-line association between the front enclosure and the rumble seat protector of an automobile, so as to eliminate objectionable wind resistance and noises.

To provide an improved assemblage of front, side, and top deflectors, each of which is independently adjustable and all of which may be collapsed into compact formation when not in use.

To provide improved mechanisms for effecting adjustment of deflector shields and for locking or maintaining the same in adjusted position.

To provide instrumentalities for preventing possible breakage of transparent deflector shields formed of glass or the like, either during adjustment or by virtue of sudden jarring of the vehicle with which the shields are associated.

To provide various other improvements in the details of construction of protective devices, whereby their utility is enhanced to a maximum while the cost of construction is reduced to a minimum.

A clear conception of embodiments of the various features of improvement and of the mode of constructing and of utilizing rumble seat protective devices built in accordance therewith, may be had by referring to the drawings accompanying and forming a part of this specification, in which like reference characters designate the same or similar parts in the various views.

Fig. 1 is a full side elevation of a convertible coupe with the front seat enclosure up and the rumble seat open, showing the improved protective device applied and in normal elevated position;

Fig. 2 is a side elevation of the rear portion of the automobile shown in Fig. 1 with a portion thereof broken away and with the front shield of the protective device swung into approximate horizontal alinement with the top shield, so as to produce a stream-line effect by closing the gap between the front seat enclosure and the front edge of the top shield;

Fig. 3 is a similar view of the rear vehicle portion with the front seat enclosure or top lowered and with the deflector shown in full lines, as in Fig. 1, and in adjusted position, as shown in dash lines;

Fig. 4 is a fragmentary plan view taken on the line 4—4 of Fig. 2 and looking in the direction of the arrows;

Fig. 5 is a rear view on the line 5—5 of Fig. 3 and looking in the direction of the arrows;

Fig. 6 is an enlarged vertical sectional view thru the protective device in use, showing the same applied to a fragment of the vehicle, the section being taken along the line 6—6 of Fig. 5, and the top shield being shown in an adjusted position in dotted lines;

Fig. 7 is a full side view similar to that of Fig. 6, showing the protective assemblage collapsed and swung into inoperative position upon the cushion of the rumble seat, the back of which has been swung into closed position;

Fig. 8 is a further enlarged fragmentary plan view of the upper side pivot portion of Fig. 4 but with the front shield in the position shown in Fig. 2;

Fig. 9 is a still further enlarged fragmentary section thru the device, taken on the line 9—9 of Fig. 8; and Fig. 10 is an enlarged fragmentary section taken along the line 10—10 of Fig. 6.

While the improved protective device has been shown and described herein as being specifically applied to and associated with the rumble seat of a convertible coupe, it is not intended to restrict the scope to such specific disclosure since the protective structure, or at least some features thereof, may be susceptible of more general application.

Referring to the drawings, the improved protective assemblage comprises in general a U-shaped frame consisting of laterally spaced side pivot rods 11 and a lower horizontal pivot cross-shaft 12 rigidly attached to the corresponding ends of the rods 11; a pair of C-shaped lower supporting arms 13 adjustably attachable at their swinging ends to the cross-shaft 12 and pivotally attachable to fixed supporting brackets 14 by means of horizontal pivot bolts 15; a front auxiliary wind shield 16 pivotally suspended from the upper ends of the side rods 11; a side wing 17 pivotally associated with each of the side rods 11; and a top shield 18 pivotally adjustably secured at its forward edge to the upper extremities of the side rods 11.

The side rods 11 and cross-shaft 12 of the U-frame may be formed of piping suitably connected to provide for the necessary rigidity, and the cross-shaft may be locked to the corresponding ends of the C-shaped arms 13 in any desired angular position by means of set-screws 19. The arms 13 are connected at their medial portions by a brace and stop tube 20 having stop pins 21 disposed in the opposite ends thereof, and the outwardly projecting ends of these stop pins 21 are adapted to engage in sockets 22 formed in rotary elements 23 pivotally supported in the brackets 14, as shown in Figs. 7 and 10. Locking levers 24 secured to the locking elements 23 by means of cap screws 25, serve to rotate the elements 23 and to thereby either lock or release the C-shaped arms 13, as shown in Figs. 6 and 7 respectively. The C-shaped arms 13 are tied together by the cross-shaft 12 and by the tube 20, so that they must always swing simultaneously about their pivot bolts 15.

The side supporting brackets 14 are rigidly attachable to a concealed portion of the vehicle body 26 at the opposite sides of and forwardly of the rumble seat 27 by means of cap screws 28 or otherwise, and the back 29 of the rumble seat structure may be folded into closed position, as shown in Fig. 7, with the protective device totally concealed when the rumble seat is not in use. When the rumble seat is in use, however, the protective device may be positioned as shown in Fig. 6, the levers 24 then being swung into upright position to lock the C-shaped arms 13 in uppermost position. The convertible coupe also has a collapsible front seat enclosure 30 disposed forwardly of and projecting above the rumble seat 27, and the side rods 11 are preferably of less height than the enclosure 30 when raised.

The front auxiliary wind shield 16 is formed of suitable transparent sheet material mounted in a rigid frame 31, and this frame has ears 32 projecting therefrom laterally of the plane of the shield. The upper ends of the side rods 11 are provided with pivot members 33, shown in Fig. 9; and the ears 32 of the wind shield 16 coact with the plane side faces of these members 33 thru friction pads 34. The top shield 18 is likewise formed of suitable transparent material mounted within a rigid frame 35, and circular friction blocks 36 are attached to the upper or forward side portions of the frame 35, as shown in Figs. 6, 8, and 9. Supporting pivots 37, which are rigidly attached to the top shield frame 35 centrally of the blocks 36, as shown in Fig. 9, penetrate the ears 32 of the shield 16 and also pierce the members 33; and friction pads 38 are also disposed between the adjacent plane surfaces of the ears 32 and blocks 36. The outer ends of the pivots 37 are disposed within sockets formed in the members 33 and are embraced by coil springs 39 and by adjustable nuts 40, which coact with these springs 39 thru washers 41. The adjusting nuts 40 have screw thread engagement with the pivots 37 and may be locked in adjusted position by cotter pins coacting with notches 42 of the nuts 40 and penetrating the pivots 37 in a well-known manner, and the pivots and nuts may be normally concealed by removable caps 43. With this assemblage of elements, the friction at the pads 34, 38 may be readily varied to cause the shields 16, 18 to remain in any desired position of adjustment while permitting convenient adjustment of these parts.

The side wings 17 may also be formed of suitable transparent sheet material and are provided at their forward edges with vertically spaced brackets 44, which have frictional engagement with pivots 45 carried by clamping brackets 46 adjustably embracing the side rods 11. The clamping brackets 46 may be locked to their respective supporting rods 11 in any desired position of angular adjustment by means of set screws 47, but the pivots 45 of the corresponding upper and lower brackets 46 must be alined. Each of the pivots 45 is embraced by a coil spring 48 similar to the springs 39, and these pivots 45 are adjustable to vary the friction for maintaining the side wings 17 in any desired position of angular adjustment relative to the rods 11. All of the elements of the assemblage are preferably neatly finished to present a pleasing appearance, and the shields, wings, and joints are mounted and secured to effectively prevent rattling.

While the mode of applying and of utilizing the improved protective device should be clearly apparent from the foregoing detailed description, its mode of adjustment will be generally reviewed.

When the protective device has been properly assembled and adjustments made for securing the requisite friction, the shields and wings may be disposed either in operative position, as shown in Fig. 6, or in inactive position, as shown in Fig. 7, by merely manipulating the levers 24 so as to either confine the pins 21 within the sockets 22, or to release these pins from the sockets as indicated in Fig. 7. In order to dispose the protective device in inactive position, it is first necessary to collapse the wings 17 and the shields 16, 18 into compact formation, as clearly indicated in the drawings.

With the improved protective device in operative position, as shown in Figs. 1-6 inclusive, the auxiliary wind shield 16 may be disposed either as shown in Fig. 1, or as shown in Fig. 2, or in any intermediate position; and this shield 16 is pivotally adjustable about the same pivots 37 which support the top shield 18, but such adjustment may be effected independently. The top shield 18 may be swung, within limits, to any desired position so as to control the down draft at the rumble seat 27; and the front shield 16 may likewise be swung to any desired position in order to control the rear draft at the rumble seat 27. When the front seat enclosure 30 is up, as shown in Figs. 1 and 2, the position of the shields 16, 18 and of the side wings 17 may be adjusted to secure any degree of draft at the rumble seat, and by disposing the front shield 16 as shown in Fig. 2, a stream-line effect for preventing noise by virtue of the gap between the shield 16 and enclosure 30 may be readily produced. If the front seat enclosure 30 is collapsed as shown in Fig. 3, the shields 16, 18 and the wings 17 may obviously be adjusted to secure any desired amount of air circulation at the rumble seat 27, independently of that obtained in the locality of the front seat.

From the foregoing description, it will be apparent that the present invention provides a simple, compact, and highly flexible protective device for a normally uncovered seat of a vehicle. The independent adjustments of the several shields and wings permit variation in the degree of air circulation obtained at the seat, and the entire device may be readily collapsed and moved out of the way when not in use, thereby maintaining normal appearance of the vehicle. This device can be installed on most standard vehicles without marring the appearance thereof and has proven highly successful in actual commercial use. The degree of friction with which the shields and wings are maintained in adjusted position may be conveniently varied, and the transparent shields are effectively guarded against possible breakage by the provision of readily adjustable joints or supports at the pivots thereof.

It should be understood that it is not desired to limit the invention to the exact details of construction and to the precise mode of manipulation of a device such as herein shown and described, for various modifications within the scope of the claims may occur to persons skilled in the art.

What I claim is:

1. A protective assemblage for the occupants of an open vehicle seat, comprising, a pair of laterally spaced side wings swingable independently of each other about upwardly extending pivots disposed forwardly of the seat, said wings and their pivots being simultaneously downwardly movable, and front and top shields independently swingable in the space between the wing pivots about a common horizontal axis disposed near the upper forward ends of the wings when elevated for controlling the rear and down draft at the seat.

2. A protective assemblage for the occupants of an open vehicle seat, comprising, a pair of laterally spaced side wings swingable independently of each other about upwardly extending pivots disposed forwardly of the seat, and front and top shields independently swingable in the space between said wings about a common horizontal axis disposed near the upper forward ends of the wings for controlling the rear and down draft at the seat, said wings and said shields being simultaneously swingable toward the seat about a horizontal pivot disposed near the lower ends of said wings.

3. A protective assemblage for the occupants of an open vehicle seat, comprising, a pair of laterally spaced side wings swingable independently of each other about upwardly extending pivots disposed forwardly of the seat, said wings and their pivots being simultaneously rearwardly and downwardly swingable about a lower pivot to position said wings directly above the seat, and front and top shields swingable in the space between said wings about a common horizontal upper axis disposed near the upper forward ends of the wings when elevated for controlling the rear and down draft at the seat.

4. A protective assemblage for the occupants of an open vehicle seat, comprising, a frame consisting of interconnected laterally spaced side members disposable forwardly of the seat, a side wing swingably supported by each of said side members, said frame being movable to simultaneously move said wings out of operative position, and front and top shields swingable in the space between said side members about a common horizontal axis disposed at the forward edge of the top shield and near the upper ends of the side members when the frame is in operative position for controlling the rear and down draft at the seat.

5. A protective assemblage for the occupants of an open vehicle seat, comprising, a frame consisting of interconnected laterally spaced side members swingable upwardly and forwardly of the seat, a side wing swingably supported by each of said side members, said wings being simultaneously movable upon swinging of said frame, and independently adjustable front and top shields swingable in the space between said side members about a common horizontal axis disposed at the forward edge of the top shield and near the upper ends of the side members when the frame is in operative position for controlling the rearward draft at the seat.

6. A protective assemblage for the occupants of an open vehicle seat, comprising, a U-shaped frame consisting of interconnected laterally spaced side members and a lower connecting member disposable forwardly of the seat, a side wing swingably supported by each of said side members above said lower member, and front and top shields carried by said frame and swingable about a common axis in the space between said side members and above said lower member when the frame is in operative position for controlling the rearward draft at the seat, said wings and said shields being simultaneously swingable toward and away from the seat by bodily movement of the frame.

7. A protective assemblage for the occupants of an open vehicle seat, comprising, a frame consisting of interconnected laterally spaced side members swingable upwardly and forwardly of the seat, a side wing swingably supported by each of said side members, and independently pivotally adjustable front and top shields carried by said frame and swingable in the space between said side members about a common horizontal axis disposed at the forward edge of the top shield and at the upper ends of the side members when the frame is in operative position for controlling the central rearward draft at the seat, said side wings and said shields being simultaneously movable toward and away from the seat during swinging of said frame.

8. A protective assemblage for the occupants of an open vehicle seat, comprising a frame consisting of side members and a cross-member connecting said side members, pivoted supporting arms attached to the ends of said side members, a side wing swingably supported by each of said side members, and front and top shields pivotally supported upon said side members for swinging movement within the space between said side members, said frame being angularly adjustable with respect to said arms and said arms being swingable with respect to a fixed support.

9. A protective assemblage for the occupants of an open vehicle seat, comprising, a U-shaped frame consisting of side members and a cross-member connecting said side members, C-shaped supporting arms adjustably attached to the ends of said side members, a side wing swingably supported by each of said side members, said side wings being simultaneously swingable with said frame and relative to said arms and said arms being swingable with respect to a fixed support, and front and top shields mounted for independent swinging movement within the space between said side members about a common pivot located at the forward edge of the top shield and near the upper forward portions of said wings.

10. A protective assemblage for the occupants of an open vehicle seat, comprising, a U-shaped frame consisting of side members and a cross-member connecting the lower extremities of said side members, C-shaped supporting arms pivotally attached to the ends of said side members, a side wing swingable about each of said side members as a pivot, front and top shields pivotally supported upon said side members for swinging movement within the space between said side members and said wings, said frame being angularly adjustable with respect to the swinging ends of said arms and the opposite ends of said arms being swingable with respect to a fixed support, and means for locking said arms in operative position.

11. A protective assemblage for the occupants of an open vehicle seat, comprising, a frame, supporting arms pivotally attached to said frame, side wings swingable about the opposite ends of said frame, front and top shields pivotally supported upon said frame for swinging movement between said side wings, said frame being angularly adjustable with respect to the corresponding ends of said arms and the opposite corresponding ends of said arms being pivotally supported with respect to a fixed support, and means for locking said arms in elevated position.

12. A protective assemblage for the occupants of an open vehicle seat, comprising, a U-shaped frame, C-shaped supporting arms secured to said frame, side wings swingably supported at the opposite ends of said U-shaped frame, front and top shields pivotally supported upon said frame for swinging movement between said side wings about a horizontal pivot located near the top of said frame, said frame being angularly adjustable with respect to said arms and said arms being pivotally mounted upon a fixed support, and means for locking said arms in elevated position in front of the seat.

13. A protective assemblage for the occupants of an open vehicle seat, comprising, a frame consisting of side members and a cross-member connecting the lower ends of said side members, pivoted supporting arms attached to said lower ends of said side members, a side wing swingably supported by each of said side members, and front and top shields pivotally supported upon the upper ends of said side members for swinging movement within the space between said side members and above said cross-member, said frame being angularly adjustable with respect to said arms and said arms being swingable with respect to a fixed support.

14. A protective assemblage for the occupants of an open vehicle seat, comprising, a frame, supporting arms pivotally attached to said frame, side wings swingable about the opposite ends of said frame, front and top shields pivotally supported upon the swinging end of said frame for movement between said side wings, said front and top shields being independently swingably adjustable and said frame being angularly adjustable with respect to the corresponding ends of said arms and the opposite corresponding ends of said arms being swingable with respect to a fixed support, and means for locking said arms in elevated position.

15. A protective assemblage for the occupants of an open vehicle seat, comprising, a pair of laterally space side wings swingable independently of each other about upwardly extending pivots disposed forwardly of the seat, said wings and their pivots being simultaneously downwardly movable, and front and top shields independently swingable in the space between the wing pivots about a common horizontal axis disposed in the same plane as the wing pivots and above the forward ends of the wings when elevated.

16. A protective assemblage for the occupants of an open vehicle seat, comprising, a U-shaped frame, C-shaped supporting arms secured to the lower portion of said frame, side wings swingably supported at the opposite sides of said U-shaped frame, front and top shields pivotally supported upon the swinging end of said frame for swinging movement between said side wings about a pivot located near the top of said frame when elevated, said frame being angularly adjustable with respect to said arms and said arms being pivotally mounted upon a fixed support, and means for locking said arms in elevated position forwardly of the seat.

WILLARD L. MORRISON.